United States Patent [19]

Reimer et al.

[11] 3,789,345

[45] Jan. 29, 1974

[54] LOW INSERTION/EXTRACTION FORCE PRINTED WIRING BOARD CONNECTOR

[75] Inventors: William A. Reimer, Wheaton; Peter K. Gerlach, Oak Park, both of Ill.

[73] Assignee: GTE Automatic Electric Corporation Laboratories Incorporated, Northlake, Ill.

[22] Filed: Oct. 2, 1972

[21] Appl. No.: 293,971

[52] U.S. Cl. .................... 339/75 MP, 339/176 MP

[51] Int. Cl. .................... H01r 13/62

[58] Field of Search.. 339/75 MP, 176 MP, 74, 174, 339/46

[56] References Cited

UNITED STATES PATENTS

| | | | |
|---|---|---|---|
| 2,936,439 | 5/1960 | Murphy | 339/176 MP |
| 2,923,911 | 2/1960 | Demurjian | 339/176 MP |

FOREIGN PATENTS OR APPLICATIONS

| | | | |
|---|---|---|---|
| 72,723 | 11/1959 | France | 339/75 MP |

OTHER PUBLICATIONS

IBM Technical Disclosure Bulletin, Vol. 9, No. 2, July 1966, Snap Connector, J. J. Shea, p. 150.

*Primary Examiner*—George H. Krizmanich
*Attorney, Agent, or Firm*—R. F. Van Epps

[57] ABSTRACT

A printed wiring board connector is provided with a plurality of spring contacts and is mounted in a bracket such that it is rotatable about a longitudinal axis. The insertion of a printed wiring board operates to rotate the connector whereby the spring contacts engage the circuits of the board. The forces necessary to insert and extract the board are thereby substantially reduced.

6 Claims, 7 Drawing Figures

LOW INSERTION/EXTRACTION FORCE PRINTED WIRING BOARD CONNECTOR

BACKGROUND OF THE INVENTION

1. Field of the Invention

The present invention relates most generally to the field of electrical connectors and more particularly to a new and improved printed wiring board connector having low board insertion/extraction forces.

Description of the Prior Art

Prior to the present invention a wide variety of printed wiring board connectors have been commercially available. These connectors all have been basically similar in comprising an elongate insulative block having a longitudinal slot containing a row of tuning fork shaped spring contacts. One continuing drawback to the use of such connectors has been the relatively high forces necessary to insert and extract a wiring board. For example, the insertion of a printed wiring board into a conventional sixty-five contact connector required an insertion force on the order of about forty pounds to be placed on the board and substantial care was required to align the board with the connector contacts. To extract the printed wiring board from such a connector required an extraction force of approximately 50 pounds to be exerted. It will be readily apparent that forces of these levels may result in damage to the wiring board or to the components which may be mounted thereon. In many electronic systems it is crucial that printed wiring boards be replaced as quickly as possible and the careful wiring board alignment requirement of the conventional connectors was not only detrimental in this respect but also precluded the use of wiring boards which are even nominally warped.

One approach to reducing the wiring board insertion-/extraction forces is described in United States Pat. No. 3,188,598 which issued to W. Pferd on June 8, 1965. The printed wiring board connector disclosed in that reference involves the use of opposed pairs of contacts each pair of which are rotatable toward one another by a cam and gear arrangement. A specially constructed printed wiring board engages the cams as it is inserted into the connector such that the opposed contacts are rotated into contact with the printed circuits. Several shortcomings attend this approach and include the requirement that each contact pair be provided with a cam and shaft assembly thus contributing to the mechanical complexity of the connector. The connector is also operative only with printed wiring boards which are specifically constructed to mate with that type of connector.

OBJECTS AND SUMMARY OF THE INVENTION

From the preceding discussion it will be understood that among the various objectives of the present invention are included the following:

the provision of a new and novel printed wiring board connector having reduced board insertion and extraction forces;

the provision of a device of the above-described character which is operative with conventional printed wiring boards; and the provision of a device of the above-described character which is of simplified construction.

These and other objectives of the present invention are efficiently achieved by providing an elongate insulative connector body having a longitudinal cavity in which are disposed a plurality of spring contact elements. The body is pivotally mounted in a supporting bracket such that when a printed wiring board is inserted into the cavity the connector body rotates about a longitudinal axis to thereby urge the spring contacts into engagement with the printed circuits of the board.

The foregoing as well as other objects, features, and advantages of the present invention will become more apparent from the following detailed description taken in conjunction with the appended drawings.

DESCRIPTION OF PREFERRED EMBODIMENT

Figure 1:
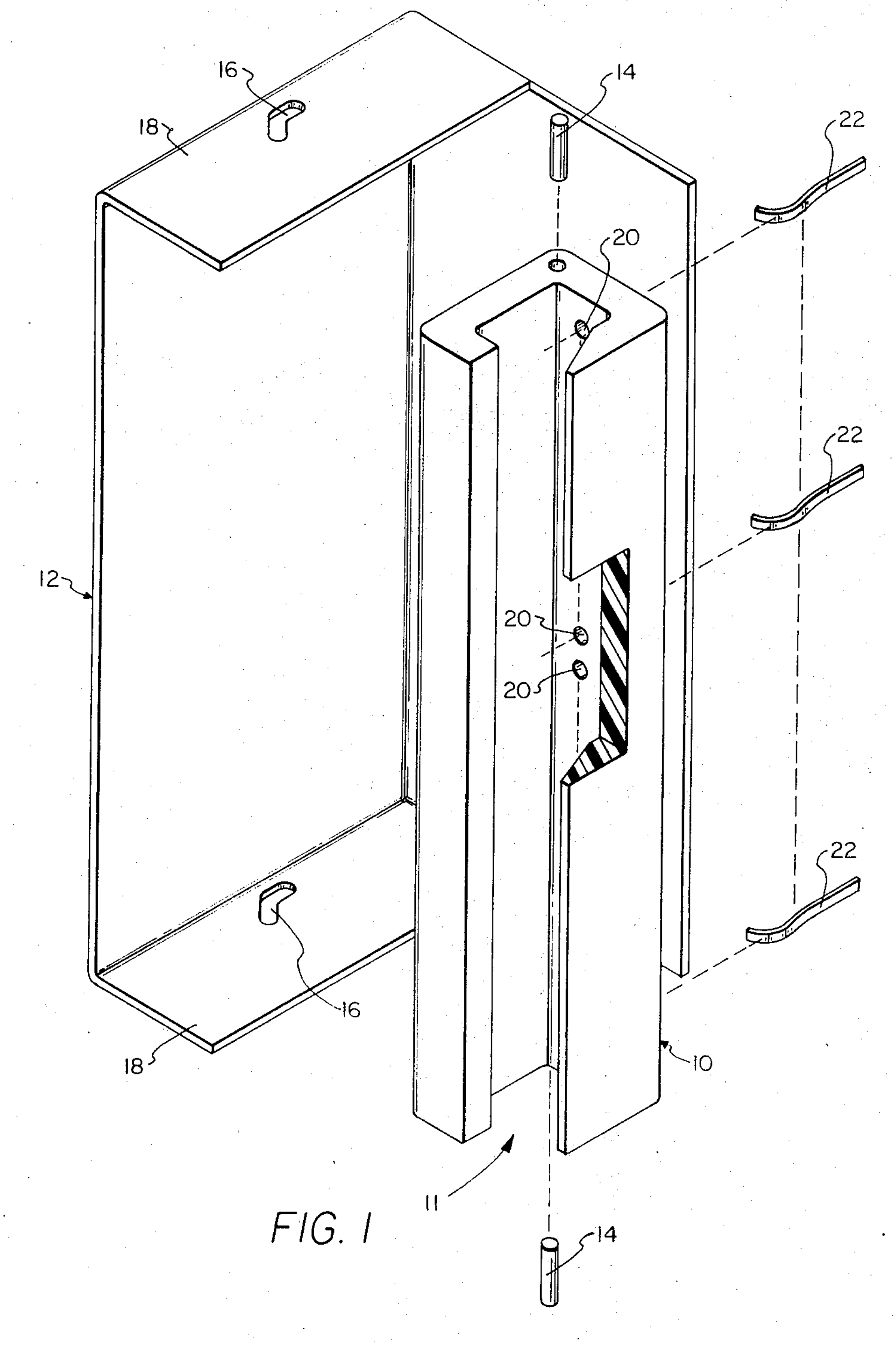
FIG. 1 is a partial exploded view of a printed wiring board connector in accordance with the principles of the present invention.

Turning now to FIG. 1 there is shown an exploded partial view of a connector constructed according to the present invention. An elongate electrically insulative connector body 10 having a generally C shaped cross section is mounted in a mounting bracket 12 having an L shaped cross sectional configuration. The connector body 10 is mounted by pivot pins 14 which are inserted into the ends of the connector body 10 and extend longitudinally therefrom through the slots 16 in end plates 18 formed with the mounting bracket 12. Thus the connector body 10 is free to rotate along the longitudinal axis passing through the pivot pins 14 and may undergo translation within the limits defined by the slots 16.

The connector body 10 is provided at its rear side with a plurality of apertures 20 through each of which an electrically conductive wire spring contact element 22 is inserted (only three being illustrated). A portion of each contact spring 22 extends rearwardly from the connector body 10 in order to provide an electrical path to a connector backplane (not shown) in a fashion to be presently described.

Figure 2A:
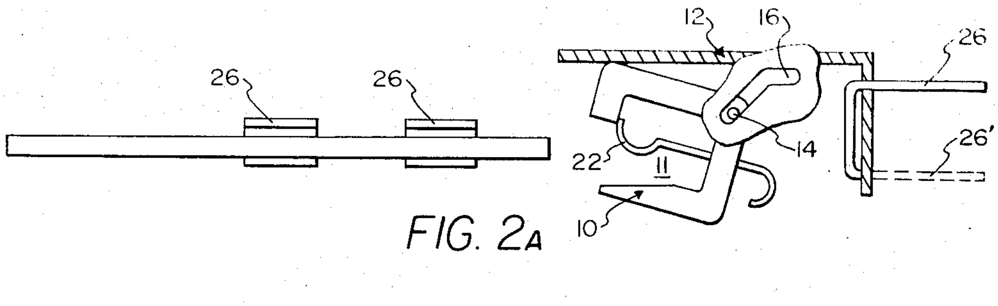
FIGS. 2A, 2B and 2C are horizontal cross section views illustrating the operation of the connector of FIG. 1.
Figure 2B:
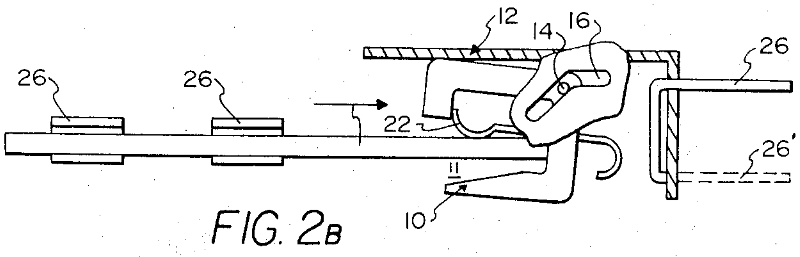
Figure 2C:
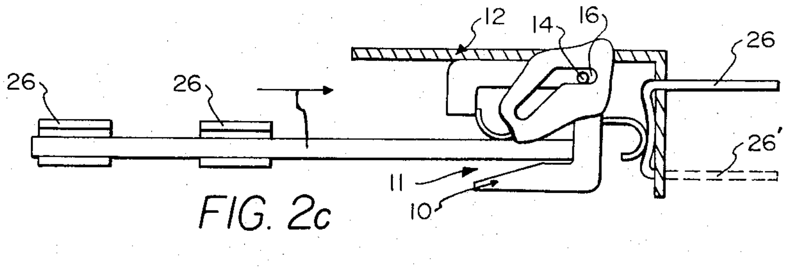

FIGS. 2A–C are cross section illustrations of the connector of FIG. 1 which better illustrate the operation thereof as well as the configuration and relationship of the structural elements. Elements common to those shown in FIG. 1 are identified by like reference numerals. The open forward portion of the C shaped connector body 10 forms a longitudinal cavity 11 for receiving a printed wiring board 24 which may be inserted and aligned with the connector body 10 by conventional card guides 26 of any convenient type. In its initial position in the mounting bracket 12 the connector body 10 is at a slight angle to the horizontal edges of the wiring board 24 and the side of the connector body 10 is therefore tapered to permit the board to be inserted. As the printed wiring board 24 is inserted (FIG. 2B) the connector body is translated by the insertion force on the printed wiring board 24 slightly to the rear and toward the side wall of the mounting bracket 12 and begins to rotate about pivot pins 14 such that the spring contacts 22 rotate into engagement with the printed circuits of the board. When the printed wiring board 24 is fully inserted (FIG. 2C) the connector body 10 has rotated and translated such that the spring contacts 22 firmly engage the printed circuits and the opposite outside surface of the connector body 10 rests squarely against the interior surface of the mounting bracket 12.

Since the spring contacts 22 are fixed with respect to the connector body 10 and are forced under tension against the printed wiring board 24 there is a biasing force which tends to rotate the connector body 10 to its original position when the wiring board is fully inserted. This tendency would, of course, be detrimental to the reliability of the contact with the wiring board. In order to overcome this the pivot pin receiving slots 16 in the mounting bracket end plates extend rearwardly at an angle toward the side wall of the mounting bracket 12 and then further toward the rear wall of the bracket. By providing for both translation and rotation of the connector body 10 the side thereof rests flatly against the side wall of mounting bracket 12 when the wiring board 24 is fully inserted such that the connector is no longer free to rotate under the normal biasing force exerted by spring contacts 22.

It will be noted that in the embodiment illustrated in FIGS. 1 and 2A–C, since the spring contacts 22 are fixed with respect to the connector body 10, the portion of the contacts extending rearwardly of the body also must rotate and translate. Although it would be possible to make electrical connections directly to the contact spring 22, it is typically undesirable to connect external wiring to a movable component of an electronic system. In order to provide a more efficient and reliable electrical connection arrangement it is preferred that the rear portion of the mounting bracket 12 be provided with a plurality of connecting contacts 26 extending therethrough. The rearward extending portions of the spring contacts 22 are then formed in a J shape such that when the connector body 10 translates and rotates the rearward end of the spring contact 22 frictionally engages the fixed connecting contact 26. In this manner the external connections to the backplane may be made to the portion of the connecting contact 26 which extends through the rear of the fixed mounting bracket 12. An additional advantage may be provided by reversing the orientation of adjacent connecting contacts; e.g., 26 and 26'. In this manner the backplane wiring terminals are on a wider spacing to facilitate the connection of external wiring while permitting a very close spacing of the vertically adjacent spring contacts 22.

Figure 3A:
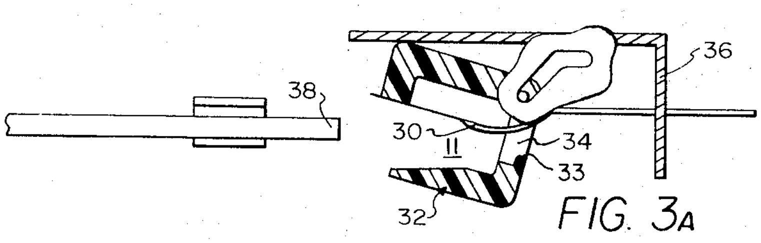
FIGS. 3A, 3B and 3C are horizontal cross section views illustrating the operation of an alternative embodiment of the present invention.
Figure 3B:
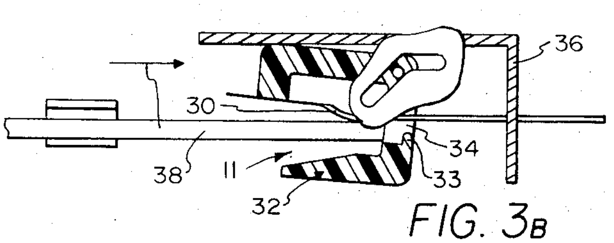
Figure 3C:
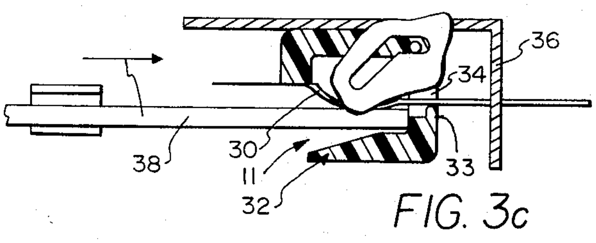

The connector illustrated in FIGS. 3A–C is basically similar to that discussed hereinabove, however, it employs a constrained spring contact 30 which is not fixed with respect to the connector body 32. In this embodiment the spring contact 30 extends from the forward edge of the connector body 32 through the card receiving cavity 11, and through a longitudinal slot 34 in the rear wall thereof. The rearwardly extending portion of the contact 30 is constrained as it passes through the mounting bracket 36 and at the point where it engages the forward end of the connector body 32. The connector body (FIG. 3A) is initially retained by the spring contact 30 in the same basic orientation with respect to the printed wiring board 38 as was the body 10 in FIGS. 1 and 2A–C. As the printed board 38 is inserted (FIG. 3B) the connector body 32 is rotated and translated in the same manner as described above. The forward end of the connector body 32 thus rotates, urging the spring contact 30 toward the wiring board 38. When the board 38 is fully inserted (FIG. 3C) the spring contact is held firmly against the printed circuits of the board 38 by the forward end of the connector body 32 and the edge of the longitudinal slot 34 in the rear wall of the connector body. A longitudinal ridge 33 may be provided at the rear edge of the slot 34 in the connector body 32 to assure a point contact with each spring contact 30. In this manner the free length of the spring contact 30 is changed such that it is fully effective to contact the circuits of the printed wiring board when it is fully inserted into the connector. As with the above-described embodiment, by providing for both translation and rotation of the connector body with respect to the mounting bracket the spring bias is efficiently prevented from rotating the body back toward its initial position when the wiring board 38 is fully inserted.

As an illustrative example of the improvement in wiring board insertion/extraction forces provided by the present invention it was found by the Applicants that only 6 pounds were required to insert the same 65 contact printed wiring board that had required forty pounds for insertion into a prior art connector. The extraction of the board required only twelve rather than fifty pounds. The electrical performance of the connector of the present invention was found to be identical to the conventional connector of the prior art. The individual spring action of the spring contacts when the connector body rotates has further been found to provide a wiping action against the printed wiring contact surfaces which serves to clean accumulated oxide film and provide a clean and thus low-resistance metal-to-metal connection between the board and connector. A further advantage is the self-aligning property of the connector of the present invention which arises from the relatively wider entry slot. The connector will thus accept even nominally warped wiring boards and, through the clamping action inherent in its operation, straighten the warped board. Nominally warped printed wiring boards which are electrically adequate but still unusable due to the close insertion tolerances of the prior art connectors are thus rendered usable with the use of a connector fabricated in accordance with the Applicant's invention.

From the foregoing it will be seen that the Applicants have provided a new and novel printed wiring board connector whereby the objectives set forth hereinabove are efficiently met. Since certain changes in the above-described construction will occur to those skilled in the art without departure from the scope of the invention it is intended that all matter contained in the preceding description or shown in the appended drawings shall be interpreted as illustrative and not in a limiting sense.

Having described what is new and novel and desired to secure by Letters Patent, what is claimed is:

1. A printed wiring board connector comprising an elongate, electrically insulative, unitary connector body having a longitudinal cavity therein adapted to receive a printed wiring board, a plurality of electrically conductive spring contact elements disposed through said connector body and extending into said longitudinal cavity, means for pivotally mounting said connector body such that said connector body is rotatable with respect to said mounting means about a longitudinal axis thereof whereby insertion of a printed wiring board into said cavity operates to rotate said connector body to thereby drive said spring contact elements into electrical contact with said printed wiring board.

2. A connector as recited in claim 1 wherein said mounting means further includes means for locking said connector body in rotation when said printed wiring board is fully inserted into said cavity to thereby retain said spring contact elements in electrical contact with said printed wiring board.

3. A connector as recited in claim 1 wherein said spring contact elements are fixed to and rotatable with said connector body.

4. A connector as recited in claim 3 further including a plurality of connecting contacts fixed to said mounting means, one associated with each of said plurality of spring contact elements, and disposed such as to engage said spring contact element when said printed wiring board is fully inserted into said cavity.

5. A connector as recited in claim 1 wherein said connector body further includes a longitudinal slot in the wall thereof opposite the entrance of said longitudinal cavity, and said spring contact elements are fixed to said mounting means, extend through said longitudinal slot and engage said connector body at the edge of said entrance of said longitudinal cavity whereby said spring contact elements are engaged and driven into electrical contact with said printed wiring board by opposed edges of said cavity and said slot when said printed wiring card is fully inserted into said cavity.

6. A connector as recited in claim 5 further including a ridge formed in said spring contact element engaging edge of said longitudinal slot to thereby provide a substantially point contact between said contact element and said edge.

* * * * *